United States Patent

[11] 3,617,219

| [72] | Inventors | James A. Cook, Jr.<br>Barberton;<br>Henry C. Stevens, Akron, both of Ohio |
| --- | --- | --- |
| [21] | Appl. No. | 830,126 |
| [22] | Filed | June 3, 1969 |
| [45] | Patented | Nov. 2, 1971 |
| [73] | Assignee | PPG Industries, Inc.<br>Pittsburgh, Pa. |

[54] PURIFICATION OF HYDROGEN PEROXIDE
13 Claims, No Drawings

[52] U.S. Cl. ................................................ 23/207, 260/369
[51] Int. Cl. .................................................... C01b 15/02, C07c 49/68
[50] Field of Search ............................................. 23/207, 207.5; 260/369

[56] References Cited
FOREIGN PATENTS

| 585,955 | 10/1959 | Canada .......................... | 23/207 |
| --- | --- | --- | --- |
| 1,283,119 | 12/1961 | France .......................... | 23/207 |

*Primary Examiner*—Oscar R. Vertiz
*Assistant Examiner*—Hoke S. Miller
*Attorney*—Chisholm and Spencer

ABSTRACT: Aqueous hydrogen peroxide solutions containing organic impurities, particularly organic esters, are purified by treatment with acid, e.g., phosphoric acid, followed by fractional distillation.

3,617,219

PURIFICATION OF HYDROGEN PEROXIDE

BACKGROUND OF THE INVENTION

The production of hydrogen peroxide by auto-oxidation a hydrocarbon work compound is well known. In that process, a work compound, usually an alkylated anthraquinone or tetrahydro derivative thereof is dissolved in a suitable solvent or solvent mixture and alternately reduced and oxidized to produce hydrogen peroxide. In the first stage, the work compound is hydrogenated in the presence of a hydrogenation catalyst, e.g., palladium. The hydrogenated work compound, after removal of the catalyst, is then oxidized by treatment with a gas containing oxygen. In the rotation step, the work compound is reformed and hydrogen peroxide produced. The hydrogen peroxide formed is separated from the working solution by conventional extraction techniques, e.g., water extraction in a packed tower. The aforementioned auto-oxidation process is suitably described in U.S. Pat. Nos. 2,158,525 and 2,215,883, as well as on pages 77–81 of the text, "Hydrogen Peroxide," by Walter C. Schumb et al., Reinhold Publishing Corporation, New York, New York (1955), which references are incorporated herein, in toto, by reference.

While the auto-oxidation process is desirable for economic and other reasons, the hydrogen peroxide produced by it characteristically contains organic impurities, e.g., the work compound, solvent system for the work compound and degradation products therefrom. The amount of organic impurities present in the crude hydrogen peroxide solution extracted from the working solution can amount to as much as 1,500 milligrams of carbon per liter, based on about an 18 percent hydrogen peroxide aqueous solution. A significant amount of these impurities can be removed by scrubbing the hydrogen peroxide solution with an organic solvent such as toluene. However, even after such scrubbing and a subsequent fractional distillation, the organic impurity content of the hydrogen peroxide product averages about 150 milligrams of carbon per liter, based on about a 35 weight percent hydrogen peroxide aqueous solution.

The degree of purity required of hydrogen peroxide solutions is determined by the degree of stability required for storage or the ultimate use to which the hydrogen peroxide is to be put. For most commercial applications, technical grade hydrogen peroxide is satisfactory. However, for medical use, food treatment, and some military applications, a very high purity hydrogen peroxide is required entirely apart from the necessity for good stability. Technical grade hydrogen peroxide (35 percent) typically averages about 150 milligrams of carbon per liter. This level of organic impurities is too high for such applications as food treatment. This is especially true when the organic impurities produce ultraviolet light absorption bands in the 280–400 millimicron range for the reason that organic carcinogenic material are known to yield ultraviolet absorption bands within the aforesaid range. Typical of such materials are those which are derived from alkyl benzenes and quinones, e.g., 2-ethylanthraquinone and methylphenols.

By Federal regulation, hydrogen peroxide suitable for food use must conform to the specifications recited in the FOOD CHEMICALS CODEX, published by National Academy of Sciences—National Research Council (Publication—1406), Washington, D.C., pages 328–330, First Edition, (1966). Moreover, such hydrogen peroxide should contain not more than two (2) parts per billion (p.p.b.) of organic material producing ultraviolet light absorption bands in the 280–400 millimicron range. Further, when the solvent system employed in the auto-oxidation process includes alkyl aromatics such as methylbenzenes, such hydrogen peroxide should contain a maximum of 20 parts per million of residual carbon from such alkylbenzenes and degradation products thereof other than acetic acid which is known to be a constituent of many accepted foodstuffs.

A number of different techniques have been proposed for removal of organic impurities from hydrogen peroxide. U.S. pat. No. 3,012,860 is directed to a process which oxidizes the organic impurities to carboxylic acids by the use of a coordination complex of a heavy metal. Thereafter, the carboxylic acids produced are removed. U.S. Pat. No. 3,016,290 adsorbs organic impurities in an aqueous hydrogen peroxide solution with finely divided activated carbon and then removes the activated carbon from the hydrogen peroxide solution. U.S. Pat. No. 3,043,666 proposes the use of a heat treatment at temperatures from 50° C. to 150° C., followed by a further organic solvent extraction of the organic impurities. The aforesaid procedure is inserted into the conventional auto-oxidation process between the initial organic solvent extraction and the fractional distillation step. The aforementioned heat treatment is said to convert color formers in the hydrogen peroxide, which are virtually colorless organic impurities, to either alkylated anthraquinones or to other colored impurities. That is, the color formers are either converted to relatively nonvolatile colored impurities, or are converted back to the original alkylated anthraquinone. U.S. Pat. No. 3,074,782 utilizes a combination of a quaternary ammonium anion exchange resin and a cation exchange resin to convert the organic impurities in the hydrogen peroxide solution to formic and acetic acids and them removes such acids from the hydrogen peroxide solution.

BRIEF SUMMARY OF THE INVENTION

It has now been discovered that hydrogen peroxide containing organic impurities, especially in the form of organic esters, can be purified without substantial loss of hydrogen peroxide assay by treating an aqueous solution of the hydrogen peroxide with acid for from about 1 to about 144 hours, more typically until substantially all of the organic esters are hydrolyzed to their corresponding organic alcohol and carboxylic acid. Thereafter, purified hydrogen peroxide is recovered, e.g., by distillation under reduced pressure. Such recovery separates hydrogen peroxide from the organic alcohol impurity, preferably from both the organic alcohol and carboxylic acid impurities, formed by the aforesaid acid treatment.

DETAILED DESCRIPTION

In the production of hydrogen peroxide by the alternate reduction and oxidation of work compounds, such as anthraquinones, the work compound is dissolved in an organic solvent to form a working solution. Typical of the work compounds used are alkyl-substituted anthraquinones. Typically, the alkyl substituent is attached in the 2-position to the anthraquinone. Usually, the alkyl substituent is a lower alkyl of from 1 to 5 carbon atoms in length. It will be appreciated that instead of an alkylated anthraquinone, other suitable substituted anthraquinones can be employed, e.g., anthraquinone, per se, and nuclearly hydrogenated anthraquinone, such as 2-ethyl tetrahydroanthraquinone. More recently, anthraquinone carboxylic esters have been described as suitable work compounds. See, for example, U.S. Pat. No. 3,098,715. As used herein, the term "anthraquinone-type compound" is intended to mean and include all of the aforementioned anthraquinone compounds. Whichever quinone compound is used, no alteration is required in the process described herein.

The organic solvent used in the aforementioned process typically comprises a mixture of two or more organic compounds for the reason that, economically, the solvent system should have as high a solubility as possible for the work compound, in both its reduced and oxidized forms. In addition, the solvent should be relatively nonvolatile to reduce solvent losses and fire and explosion hazards; it should be insoluble in water so that the hydrogen peroxide produced can be extracted as a substantially pure aqueous solution; and, it should be stable to oxidation. A high distribution coefficient for hydrogen peroxide between water and the solvent system is also important in order to produce hydrogen peroxide in reasonable concentrations and yields.

Among the organic solvents which have been employed are hydrocarbons, alcohols, keytones and carboxylic acid esters. Typical of the ketones used are dialkyl ketones containing from 2 to 17 carbon atoms, e.g., diethyl ketone, diisopropyl ketone, diisobutyl ketone and acetophenone. Among the more common of the alcohols used as solvents are alkyl and cycloalkyl monohydric alcohols containing from 5 to 12 carbon atoms, e.g., amyl alcohol, cyclohexanol, methyl cyclohexanol, dimethyl cyclohexanol, octyl alcohol, nonyl alcohol and decyl alcohol. Typical of the hydrocarbon solvents which have been used are the higher alkanes, as, for example, $C_7$–$C_{10}$ alkanes, such as heptane and decane; $C_5$–$C_8$ cycloalkanes, such as cyclopentane, cyclohexane, methyl cyclohexane and dimethyl cyclohexane; $C_6$–$C_8$ aromatic hydrocarbons, such as benzene, toluene and xylene and mixtures of aromatic hydrocarbons sold under the trade names "Aramasol" and "SC-150(H)." "Aramasol" is a mixture of aromatic hydrocarbons containing about 70 weight percent trimethylbenzenes and having a boiling range of between 165° C. and 210° C. SC-150(H) is a mixture of hydrocarbons containing about 90 percent aromatic hydrocarbons and having a distillation range of between 365° F. and 425° F. and is produced and sold under the aforementioned symbol by Humble Oil and Refining Company.

Among the more common organic esters employed in solvent systems are the esters of monocarboxylic acids having from 1 to 5 carbon atoms wherein the alcoholic portion of the ester is derived from $C_1$–$C_8$ alkyl and cycloalkyl alcohols. Particularly useful are the cyclohexanol, methylcyclohexanol and dimethylcyclohexanol esters of acetic acid, such as a solvent containing an isomeric mixture of methylcyclohexyl acetates as its principal constituent and sold under the trade name "-Sextate" by Howards of Ilford, Ltd., Ilford, England.

One useful mixed organic solvent system comprises equal parts by volume of methylcyclohexyl acetate and dodecyl benzene. Other typical solvent mixtures include: methylethyl ketone and dodecyl benzene, benzene and methylcyclohexyl acetate, diisobutyl carbonyl and alpha-methyl naphthylene, and xylene and methylcyclohexanol.

In the auto-oxidation process for producing hydrogen peroxide, an anthraquinone work compound, such as 2-ethyl anthraquinone, dissolved in an organic solvent is catalytically reduced with hydrogen gas in the presence of a hydrogenation catalyst, such as palladium or nickel on sodium alumina silicate. After reduction, the hydrogenated (reduced) anthraquinone or anthrahydroquinone solution is separated from the hydrogenation catalyst, e.g., by filtration, and thereafter contacted in an oxidizing zone with an oxygen-bearing gas. On oxidation, the anthrahydroquinone is reconverted to the original anthraquinone and hydrogen peroxide. Hydrogen peroxide so formed is extracted from the organic solution with water.

The crude extracted hydrogen peroxide contains a relatively large amount of organic impurities. Thus, the crude hydrogen peroxide is normally saturated with the solvent system and it can also contain traces of the work compound and degradation products of both the work compound and solvent system. Typically, therefore, the crude hydrogen peroxide is purified by extraction with an organic solvent, e.g., such as by scrubbing with toluene, and thereafter distilled to yield a technical grade of hydrogen peroxide. Technical grade hydrogen peroxide, while relatively pure, still contains a small amount of organic impurities. These organic impurities are representative of the organic compounds previously removed by extraction and distillation. A goodly proportion of the remaining impurities in technical grade hydrogen peroxide are believed to be composed principally of compounds derived from the organic solvent system rather than from the work compound. When the solvent system includes an organic ester, such as methyl cyclohexyl acetate, (Sextate), the remaining organic impurities are believed to be composed principally of the organic ester portion of the solvent system due to the inherent difficulty of separating such esters from hydrogen peroxide by distillation.

The starting material for the process described herein comprises an aqueous solution of hydrogen peroxide. Such aqueous solution can be the crude hydrogen peroxide solution obtained from the aqueous extraction of hydrogen peroxide from the working solution removed for the oxidizing zone, the aqueous hydrogen peroxide solution obtained from scrubbing of the crude hydrogen peroxide solution with an organic solvent, or the hydrogen peroxide obtained by fractional distillation of the aforementioned scrubbed product, i.e., technical grade hydrogen peroxide. The level of organic impurities in the hydrogen peroxide will, of course, vary with the starting material. Generally, the greater the organic impurity content, the larger the quantity of acid required, as discussed hereinafter, and/or the longer the treatment required. Therefore, for economic reasons, it is preferred that the starting material be a hydrogen peroxide solution that has been scrubbed with an organic solvent to remove a substantial amount of the organic impurities, or a distilled aqueous hydrogen peroxide solution, e.g., technical grade hydrogen peroxide. The latter is most preferred for the reason that the purification step described herein can be simply tacked on to an already existing hydrogen peroxide facility.

Typically, the organic impurity content of technical grade hydrogen peroxide (35 weight percent solution) averages about 150 milligrams of carbon per liter. The exact level or organic ester impurity content will vary with the particular autooxidation process and especially with the particular type of organic solvent system employed. Therefore, organic impurity contents of from about 50 milligrams of carbon per liter to 1500 milligrams of carbon per liter (35 weight percent hydrogen peroxide) are contemplated as being present in the starting material of the present process. Hydrogen peroxide solutions with organic impurity contents above 500 milligrams of carbon per liter will typically be given an initial organic solvent extraction treatment to bring the organic impurity level down to that at which the acid digestion treatment described herein can be utilized economically.

In accordance with the process of the present invention, an aqueous hydrogen peroxide solution is treated with a mineral acid, or derivative thereof. Examples of utilizable acids include: sulfuric acid, nitric acid, hydrochloric acid, phosphoric acid, methane and toluene sulfonic acid, trifluoroacetic acid and trichloroacetic acid. The aforesaid inorganic mineral acids are preferred. Phosphoric acid is particularly preferred for the reason that it is more compatible with hydrogen peroxide than other mineral acids and is less corrosive to processing equipment than, for example, nitric acid or sulfuric acid. The amount of acid used in the present process will vary with the amount of organic impurity, e.g., organic ester content, present in the aqueous hydrogen peroxide solution treated. Generally, between about 50 and about 50,000, preferably between about 100 and about 1,000 parts of acid per million parts by weight of hydrogen peroxide solution can be used. More typically, the amount of acid used will be that amount which is sufficient to furnish the hydrogen ion concentration required to hydrolyze substantially all of the organic ester impurities present in the hydrogen peroxide solution at a satisfactory rate, e.g., within 24 to 72 hours.

The digestion period during which the hydrogen peroxide solution is treated with acid will vary depending on the amount of organic impurity present in the solution, the temperature of digestion, and the hydrogen ion concentration (pH) established in the solution. Typically, contact times of from 1 to 144 hours or more, usually from 24 to 72 hours, will be used. SUfficient time should be allowed for the acid hydrolysis of substantially all of the organic esters present in the hydrogen peroxide solution. The organic ester content of the solution can be determined by exhaustive extraction of the solution (saturated with sodium sulfate) with methylene chloride followed by infrared measurement of the combined extracts for absorption in the ester carbonyl region. Comparison of the aforesaid measurement with the infrared measurement of a known sample yields the desired information.

The temperature of acid treatment can vary over a broad range but typically will vary from room temperature, i.e., about 20° C., to about 120° C., usually between about 40° C. and about 70° C., e.g., about 50° C. At elevated temperatures, hydrogen peroxide undergoes natural decomposition. The higher the temperature of treatment, the faster the rate of organic ester hydrolysis, but, the faster the rate of hydrogen peroxide decomposition. Therefore, the temperature of treatment must be balanced against the natural decomposition rate of hydrogen peroxide.

The apparent pH of the hydrogen peroxide solution during acid treatment will generally be below 1. Although not required, it is convenient to agitate the hydrogen peroxide solution during acid treatment to alleviate any temperature gradients that might be formed.

From the above discussion, it can be seen that the conditions of acid treatment, i.e., hydrogen ion concentration, temperature and rate of organic ester hydrolysis are interdependent and that a balance must be struck between the three conditions to achieve purification at a convenient rate and temperature without substantial loss of hydrogen peroxide assay.

Following acid digestion, hydrogen peroxide is separated from the hydrolysis products resulting therefrom by conventional techniques such as by fractional distillation. Since the organic alcohol and acid from which the organic ester impurities are formed have higher and lower boiling points, respectively, than the organic ester, the organic alcohol and acid are removed from the hydrogen peroxide by fractional distillation.

The distillation of aqueous hydrogen peroxide solutions is a well-known technique. See, for example, U.S. Pat. No. 3,073,755, which is incorporated herein, in toto, by reference. Typically, distillation of hydrogen peroxide requires the vaporization of a low strength hydrogen peroxide feed, e.g., about 20 weight percent, and the feeding of the vapors obtained to a distillation column operated at between about 60° C. and about 70° C. under a vacuum of about 100 millimeters of mercury. By the action of such column, water vapor low in hydrogen peroxide content relative to the hydrogen peroxide content of the feed leaves at the upper end of the column while aqueous hydrogen peroxide rich in hydrogen peroxide content, typically about 65 weight percent, leaves at the lower end of the column. DUring the operation of the column, it is customary to introduce water into the top of the column as reflux. This distillation procedure prevents the autocatalytic decomposition of hydrogen peroxide. The amount of reflux water added should be equal to the total number of moles of water and hydrogen peroxide issuing from the bottom of the column. For example, if 18 w./w. $H_2O_2$ is fed to a distillation column producing 66 percent w./w. with a purge rate of 5 percent of the feed $H_2O_2$, an overhead loss of 0.3 percent and a decomposition of 2.5 percent, then for every gallon of feed, about 0.2 gallon of reflux water is required.

Hydrogen peroxide prepared in accordance with the process described herein, e.g., acid digestion, followed by separation of the acid hydrolysis products by, for example, fractional distillation, has a reduced organic impurity content over that of the starting material and is suitable for food processing. As a food grade product, it satisfies the specifications of the Food Chemicals Codex for hydrogen peroxide, the level of impurities having an ultraviolet absorbance in the 280–400 millimicron range and the level of residual carbon from alkyl benzene solvent.

In accordance with a preferred embodiment of the present process, a 35 percent solution of technical grade hydrogen peroxide is contacted with about 300 parts per million of concentrated phosphoric acid under agitation at about 50° C. for about 72 hours. The treated hydrogen peroxide is distilled and hydrogen peroxide of food grade quality recovered.

In a further embodiment of the present process, the treated hydrogen peroxide either before or after distillation is further treated with activated carbon to remove additional impurities. Any type of commercially available activated carbon low in metal content can be used. Contact times of from about 1 to about 10 minutes, e.g., 5 minutes, can be used.

The hydrogen peroxide produced in accordance with the present process will typically have a total carbon content of less than 100 milligrams per liter, usually less than 50 milligrams per liter. Preferably, the purified hydrogen peroxide will have a carbon content of less than 25 milligrams per liter, most preferably less than about 10 parts per million of carbon, all based on a 35 weight percent hydrogen peroxide solution.

While not intending to limit the invention in any way, the following examples illustrate the manner in which the invention can be performed.

EXAMPLE I 2-ethyl anthraquinone was dissolved in a solvent consisting of 15 parts by volume of SC-150(H) and 85 parts by volume of Sextate to produce a solution containing 42 grams of 2-ethyl anthraquinone per liter of solvent. About 100 gallons of this solution was placed in a hydrogenation chamber and circulation of further solution at the rate of 3 gallons per minute into and out of the reactor was begun. The solution was withdrawn from the hydrogenator through a filter capable of removing catalyst, and was delivered to an oxidizer containing 150 gallons of solution at a rate of about 3 gallons per minute. Solution was withdrawn from the oxidizer at the same rate and delivered to the bottom of a continuous extraction column, water being supplied to the top of the column. Solution coming from the top of the column was passed through a bed, several feed deep, of active alumina having a particle size of 8 to 14 mesh, and was returned to the hydrogenator.

After circulation was commenced, the hydrogenator was purged with nitrogen. Thereafter, 5 pounds of metallic palladium catalyst on alumina carrier was suspended in the hydrogenator solution and hydrogen gas was introduced into the mixture at a rate of 6 to 7 cubic feet per minute, measured at 760 millimeters pressure and a temperature of 70 ° F., effecting turbulent agitation of the mixture, suspension of the catalyst, and hydrogenation of the anthraquinone. This process was conducted continuously by feeding in fresh solution at 3 gallons a minute and withdrawing solution containing the 2-ethyl anthrahydroquinone in amount equivalent to 4 to 5 grams of hydrogen peroxide. Further catalyst was added from time to time to maintain this rate of hydrogenation. During the hydrogenation the solution was held at a temperature of 80° to 125° F.

The hydrogenated solution was continuously removed from the hydrogenator, filtered free of catalyst, and delivered to a reactor in which it was reacted with air at an ambient temperature of about 30° C., usually about 32° C., until the anthrahydroquinone was substantially completely oxidized. The oxidized solution was extracted with water in the proportion of about one part by volume of water per 50 volumes of solvent at a temperature of about 80 ° F. or below, a water solution containing 20 percent by weight of $H_2O_2$ being produced.

The organic solution which was saturated with water at the extraction temperature was heated to a temperature about 5° to 15° F. above that at which the extraction was conducted. The heated solution was recycled to the hydrogenator for further hydrogenation, as described above.

The 20 percent aqueous hydrogen peroxide solution from the extraction step was passed to a toluene scrubber. Toluene was the continuous phase and hydrogen peroxide the dispersed phase. Three volumes of toluene per 10 volumes of hydrogen peroxide solution were fed to the scrubber, the fresh toluene being added at the bottom of the scrubber and aqueous hydrogen peroxide to the top. Analysis of the hydrogen peroxide solution before and after toluene scrubbing for total carbon content and for carbon content as Sextate was performed. Two such analyses during the above run are tabulated in table I.

TABLE I

Analyses of Aqueous $H_2O_2$ Before and After Toluene Scrubbing

| Before Scrubbing | | After Scrubbing | |
|---|---|---|---|
| Total Carbon as p.p.m., C | Sextate as C, p.p.m. | Total Carbon as p.p.m., C | Sextate as C, p.p.m. |
| 870 | 379 | 660 | 182 |
| 840 | 391 | 794 | 209 |

Aqueous hydrogen peroxide from the toluene scrubber was then distilled in the conventional manner and carbon analysis of the 35 percent product performed. The results of those analyses are tabulated in table II. A portion of the 35 percent product was redistilled and its carbon analysis is also reported in table II.

TABLE II

Analyses of Distilled $H_2O_2$

| Product (%) | Total Carbon p.p.m. | As Acetic Acid | Carbon, p.p.m. As Sextate |
|---|---|---|---|
| 35 | 112 | 46 | 62 |
| 35 (Redistilled) | 71 | 39 | 21 |

EXAMPLE II

A portion of 35 percent distilled hydrogen peroxide obtained in a manner analogous to example I was treated with varying amounts of 85 percent phosphoric acid at 50° C. and 70° C. The treatment was carried out in a 12-liter flask equipped with a heating mantel, a thermometer, a motor-driven paddle stirrer, and a thermometer mounted capacitance relay as the temperature controlling device. Analyses of the "Sextate" content of the 35 percent aqueous $H_2O_2$ during treatment, in terms of the carbon it represents, are reported in table III.

TABLE III $H_3PO_4$ Acid/Heat Treatment of 35 percent Distillation Product

| $H_3PO_4$ Added g./l. | Elapsed Time, hr. | "Sextate" as Carbon, p.p.m. 50° C. | 70° C. |
|---|---|---|---|
| 0.85 | 0 | | 55 |
| | 19 | | 26 |
| | 24 | | 21 |
| | 48 | | 10 |
| 8.5 | 0 | 40 | 40 |
| | 1 | 36 | 32 |
| | 3 | 36 | 25 |
| | 5 | 30 | 18 |
| | 22 | 7 | 4 |
| | 48 | 5 | 2 |

A portion of phosphoric acid treated $H_2O_2$ material containing 149 p.p.m. of total carbon of which 6.7 p.p.m. was Sextate was distilled in the conventional manner. The results are tabulated in table IV.

TABLE IV

[Distillation of $H_3PO_4$ acid heat treated $H_2O_2$]

| Feed | | | Product | | | |
|---|---|---|---|---|---|---|
| | | | | | As carbon, p.p.m. | |
| $H_2O_2$, percent | Carbon, p.p.m. | Sextate as C., p.p.m. | $H_2O_2$, percent | Carbon, p.p.m. | Sextate | Acetic acid |
| 37.61 | 149 | 6.7 | 81.92 | 63 | 3.9 | 37 |
| Diluted to 35% $H_2O_2$ | | | 35.00 | 24 | 1.4 | 13 |

EXAMPLE III

A portion of the 35 percent $H_2O_2$ prepared in example II was found to assay 33.89 percent $H_2O_2$ and to contain 10.1 p.p.m. of total carbon of which 7.2 p.p.m. of carbon was present as acetic acid and 1 p.p.m. of carbon was present as "-Sextate." This $H_2O_2$ was treated with 10 grams of "Darco G60" activated carbon per liter of $H_2O_2$. The activated carbon was stirred with the $H_2O_2$ for 5 minutes at room temperature and then the slurry was filtered through a 1$\mu$ filter. The resulting $H_2O_2$ solution had an unchanged assay but the total carbon content was found to be 5 p.p.m.

EXAMPLE IV

The procedure of example II was repeated with sulfuric acid at 50° C., 70° C., and 90° C. on a 20 percent $H_2O_2$ crude solution, i.e., from the water extraction step and with nitric acid at 50° C. and 70° C. on a 35 percent $H_2O_2$ distilled product. The results are tabulated in table V and compared to no acid treatment of a 35 percent distilled product at 50° C. and of a 20 percent crude solution at 70° C.

The data of examples II and IV show that the acid digestion treatment of the present process substantially reduces the level of organic impurities in hydrogen peroxide produced by the auto oxidation process. The data of examples II and III further show that the level of organic impurities can be further reduced subsequent to acid digestion by a further distillation or activated carbon treatment.

TABLE V

[Acid/heat treatment of $H_2O_2$]

| Acid | Concentration, g./l. | Type $H_2O_2$ | Time, hrs. | Carbon as Sextate, p.p.m. 50° C. | 70° C. | 90° C. |
|---|---|---|---|---|---|---|
| $H_2SO_4$ | 10 | 20% crude | 0 | 135 | 135 | 135 |
| | | | 1 | 89 | 48 | 12 |
| | | | 3 | 38 | 21 | 12 |
| | | | 5 | 26 | 11 | 6 |
| $H_2SO_4$ | 10 | do | 0 | 67 | 153 | |
| | | | 18 | 11 | 4 | |
| HNO_3 | 7 | 35% distillation | 0 | 67 | 67 | |
| | | | 1 | 50 | 27 | |
| | | | 3 | | 10 | |
| | | | 20 | 20 | 7 | |
| | | | 25 | 14 | 7 | |
| | | | 43 | 11 | 4 | |
| None | | do | 0 | 68 | | |
| | | | 1 | 68 | | |
| Do | | 20% crude | 0 | | 153 | |
| | | | 1 | | | |
| | | | 6 | | 126 | |
| | | | 23 | | 99 | |
| | | | 30 | | 91 | |

Although this invention has been described with reference to special details of certain embodiments, it is not intended that the invention be construed as limited to such details except insofar as such details appear in the appended claims.

We claim:

1. A process for treating an aqueous solution of hydrogen peroxide produced by auto oxidation of anthraquinone-type compounds, which comprises the steps of contacting said hydrogen peroxide solution with from 50 to about 50,000 parts of mineral acid per million parts of said solution at temperatures of from about 20° C. to about 120° C. for from about 1 to about 144 hours, and recovering purified hydrogen peroxide.

2. A process according to claim 1 wherein the purified hydrogen peroxide is recovered by distillation under reduced pressure.

3. A process according to claim 1 wherein the mineral acid is selected from the group consisting of sulfuric acid, nitric acid, hydrochloric acid, phosphoric acid, methane sulfonic acid, toluene sulfonic acid, trifluoroacetic acid, and trichloroacetic acid.

4. A process according to claim 1 wherein from 100 to 1,000 parts of mineral acid per million parts of hydrogen peroxide solution are used.

5. A process according to claim 1 wherein said aqueous solution of hydrogen peroxide contains organic ester impurities and said purified hydrogen peroxide contains a reduced level of organic ester impurities.

6. A process for treating an aqueous solution of hydrogen peroxide containing organic ester impurities, said hydrogen peroxide having been produced by auto oxidation of anthraquinone-type compounds, which comprises contacting said hydrogen peroxide solution with from 50 to 50,000 parts of mineral acid per million parts of said solution for a time sufficient to hydrolyze organic ester impurities contained therein and recovering an aqueous hydrogen peroxide solution having a reduced organic ester content.

7. A process according to claim 6 wherein said hydrogen peroxide solution contains methylcyclohexyl acetate impurities.

8. A process according to claim 7, wherein the mineral acid is selected from the group consisting of sulfuric acid, nitric acid, hydrochloric acid, phosphoric acid, methane sulfonic acid, toluene sulfonic acid, trifluoroacetic acid and trichloroacetic acid.

9. A process according to claim 8 wherein from 100 to 1,000 parts of mineral acid per million parts of hydrogen peroxide solution are used.

10. A process according to claim 6 wherein the hydrogen peroxide solution of reduced organic ester content is recovered by distillation under reduced pressure.

11. A process for removing organic ester impurities from aqueous solutions of hydrogen peroxide produced by auto oxidation of anthraquinone-type compounds, which comprises contacting said hydrogen peroxide solution with from 50 to 50,000 parts, per million parts of said solution, of an inorganic mineral acid selected from the group consisting of sulfuric acid, nitric acid, hydrochloric acid, and phosphoric acid at temperatures of from about 20° C. to about 120° C. for from about 1 to about 144 hours, distilling the treated hydrogen peroxide solution and recovering a hydrogen peroxide solution having a reduced level of organic ester impurities.

12. A process according to claim 11 wherein the hydrogen peroxide solution contains methylcyclohexyl acetate impurities.

13. A process according to claim 12 wherein from 100 to 1,000 parts of mineral acid per million parts of hydrogen peroxide solution are used.

* * * * *